(12) United States Patent
Hombs et al.

(10) Patent No.: US 10,205,557 B2
(45) Date of Patent: *Feb. 12, 2019

(54) WIRELESS RECEIVER FOR TURBO LOOP MULTIUSER DETECTION INCORPORATING REUSE OF QR COMPONENT

(71) Applicant: Collision Communications, Inc., Peterborough, NH (US)

(72) Inventors: Brandon Hombs, Merrimack, NH (US); Sayak Bose, Nashua, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,258

(22) Filed: Dec. 11, 2017

(65) Prior Publication Data

US 2018/0102869 A1    Apr. 12, 2018

Related U.S. Application Data

(63) Continuation of application No. 15/094,109, filed on Apr. 8, 2016, now Pat. No. 9,843,462.

(51) Int. Cl.
*H04L 1/00* (2006.01)
*H04L 25/03* (2006.01)

(52) U.S. Cl.
CPC ........ *H04L 1/005* (2013.01); *H04L 25/03968* (2013.01); *H04L 2025/03356* (2013.01); *H04L 2025/03611* (2013.01)

(58) Field of Classification Search
CPC .. H04B 7/0857; H04B 17/345; H04B 7/0851; H04L 25/03949; H04L 25/021; H04L 25/0256

See application file for complete search history.

(56) References Cited

U.S. PATENT DOCUMENTS 8,102,924 B2 * 1/2012 Pisoni ............... H04L 25/03159
370/352
8,335,248 B2 * 12/2012 Gore ................... H04L 25/0204
375/232

(Continued)

OTHER PUBLICATIONS

Choi, J.W., et al., "Improved Linear Soft-Input Soft-Output Detection via Soft Feedback Successive Interference Cancellation," IEEE Transactions on Communications, vol. 58, No. 3, Mar. 2010, 12 pages.

(Continued)

*Primary Examiner* — Khanh C Tran (57) ABSTRACT

An improved receiver design implements a method for modeling users in SIC turbo loop multiuser detection architectures that reduces the number of implementation cycles, and thereby reduces the computational overhead associated with computing the inverse of the received signal covariance matrix, by efficiently reusing components of a QR decomposition. By reusing some of the computational results from the previous turbo loop's equalizer calculation, the disclosed receiver significantly reduces the computational burden of updating the linear equalizer on each turbo loop. Depending on the embodiment, this reduction can be accomplished in at least two different ways, depending on the dimensionality and other aspects of the implementation.

31 Claims, 4 Drawing Sheets

(56) References Cited

U.S. PATENT DOCUMENTS

| | | | | |
|---|---|---|---|---|
| 2007/0060061 A1* | 3/2007 | Sampath | ............. | H04B 7/0817 |
| | | | | 455/63.1 |
| 2007/0280336 A1* | 12/2007 | Zhang | ............... | H04L 25/03292 |
| | | | | 375/148 |
| 2009/0323777 A1* | 12/2009 | Wang | ..................... | H04B 1/712 |
| | | | | 375/148 |

OTHER PUBLICATIONS

Nguyen, H.X., et al., "Signal Detection for 3GPP LTE Downlink; Algorithm and Implementation," International Journal on Advances in Telecommunications, vol. 4, No. 1 & 2, year 2011, 14 pages.

Zimmermann, E., et al., "Adaptive vs. Hybrid Iterative MIMO Receivers Based on MMSE Linear and Soft-Sic Detection," proceedings of the $17^{th}$ Annual IEEE International Symposium on Personal, Indoor, and Mobile Radio Communications (PIMRC*06), 2006, 5 pages.

\* cited by examiner

WIRELESS RECEIVER FOR TURBO LOOP MULTIUSER DETECTION INCORPORATING REUSE OF QR COMPONENT

RELATED APPLICATIONS

This application is a continuation of U.S. Pat. No. 9,843,462, titled, "Improved Wireless Receiver For Turbo Loop Multiuser Detection Incorporating Reuse Of QR Component," filed on Apr. 8, 2016, the entire disclosure of which is here incorporated by reference.

FIELD

The invention relates to receivers used in wireless communication networks, and more particularly, to receivers that are configured for turbo loop multiuser detection in wireless telecommunication.

BACKGROUND

Multiuser detection ("MUD") is an effective approach for detecting multiple, simultaneous data streams transmitted by a plurality of frequency sources (generically referred to herein as "users") on a common frequency channel, thereby providing a significant increase in the spectral efficiency of the communication network. Applications include, but are not limited to, cellular telephone communication of voice and data to and from cellular handsets, other wireless mobile devices, and wireless base stations.

Several methods can be used to perform multiuser detection, including minimum mean-square error (MMSE), zero forcing (ZF), maximum-likelihood detection (MLD), and such like. MLD provides the best performance, but at the cost of very high implementation complexity. Therefore, less complex but close to optimal non-linear successive interference cancellation (SIC) based receiver architectures involving turbo loops have recently become very attractive.

In a turbo looped architecture, so as to further reduce complexity, linear MMSE-IRC (interference rejection combining) equalization is generally performed on data streams in successive turbo loops. However, as the dimensions of equalization increase, due for example to an increase in the number of users and/or the number of antennas used in a MIMO multiuser system, the computational complexity increases at a rate that is more than linear.

Most of the computational complexity of a linear MMSE equalization is associated with computing the inverse of the received signal's covariance matrix. Several efficient numerical methods of obtaining the solution of a linear system can be found in the literature, such as QR decomposition, Gauss-Jordan elimination, Cholesky decomposition, and such like. Among these methods, QR decomposition followed by backward and forward substitution has been shown to be robust in achieving a high accuracy solution without any need to compute the covariance matrix and without performing an actual matrix inversion. However, even when implementing QR decomposition there can be significant, potentially impractical computational overhead (in terms of MIPS) when implementing a turbo loop based approach, even for a moderately large MIMO multiuser system.

It is therefore essential for meeting standard product release criteria to develop methods that reduce the computational complexity of a turbo-looped implementation, while retaining near-optimal turbo-loop performance.

What is needed, therefore, is an improved receiver design for modeling users in SIC turbo loop multiuser detection architectures that reduces the computational complexity of the turbo-looped implementation while retaining near-optimal turbo-loop performance.

SUMMARY

An improved receiver design implements a method for modeling users in SIC turbo loop multiuser detection architectures having a reduced computational overhead, so that the receiver design is applicable to practical, "real world" communication networks that have reasonably high degrees of complexity. The disclosed method reduces the number of implementation cycles, and thereby reduces the computational overhead associated with computing the inverse of the received signal covariance matrix, by efficiently reusing components of a QR decomposition.

For near optimality, it is necessary for a turbo SIC receiver to update the linear equalizer on each turbo loop. This can add significant computational overhead, because it requires a matrix inversion. By reusing some of the computational results from the previous turbo loop's equalizer calculation, the disclosed receiver significantly reduces this computational burden. Depending on the embodiment, this reduction can be accomplished in at least two different ways, depending on the dimensionality and other aspects of the implementation.

A first general aspect of the disclosed method for efficiently estimating a plurality of unknown values included in a signal transmitted over a subcarrier of a transmission by a signal source includes receiving the signal from the signal source, and in a first turbo loop:
  a) estimating an interference plus noise covariance matrix according to a residual signal either received during a period when the signal source is not transmitting, or obtained by removing known values of the signal from a received training vector;
  b) determining an equalizer function;
  c) obtaining estimates of the unknown values by applying the equalizer function to the received signal;
  d) deriving a residual signal by subtracting the value estimates from the received signal; and
  e) determining a residual amplitude matrix representing value amplitudes that remain after the subtraction of step d).

The method further includes repeating steps b), c), and d) in at least one turbo loop following the first turbo loop until estimates of the plurality of unknown values are obtained, each loop being applied to the residual signal vector and residual amplitude matrix obtained in the preceding loop.

According to the method, determining the equalizer function in step b) of the first turbo loop includes performing a QR decomposition, and determining the equalizer function in step b) of turbo loops after the first turbo loop includes performing calculations that incorporate at least a partial result of the QR decomposition.

A first general aspect of the disclosed apparatus for efficiently estimating a plurality of unknown values included in a signal transmitted over a subcarrier of a transmission by a signal source includes a receiver unit and a signal processing unit. The receiver unit is configured to receive the signal from the signal source. The signal processing unit is configured in a first turbo loop to:
  a) estimate an interference plus noise covariance matrix according to a residual signal either received during a period when the signal source is not transmitting, or obtained by removing known values of the signal from a received training vector;

b) determine an equalizer function;

c) obtain estimates of the unknown values by applying the equalizer function to the received signal;

d) derive a residual signal by subtracting the value estimates from the received signal; and e) determine a residual amplitude matrix representing value amplitudes that remain after the subtraction of step d).

The signal processing unit is further configured to repeat steps b), c), and d) in at least one turbo loop following the first turbo loop until estimates of the plurality of unknown values are obtained, each loop being applied to the residual signal vector and residual amplitude matrix obtained in the preceding loop, According to this first aspect, determining the equalizer function in step b) of the first turbo loop includes performing a QR decomposition, and determining the equalizer function in step b) of turbo loops after the first turbo loop includes performing calculations that incorporate at least a partial result of the QR decomposition.

A second general aspect of the disclosed apparatus includes a non-transitory computer readable medium storing a computer program, executable by a machine, for efficiently estimating a plurality of unknown values included in a signal transmitted over a subcarrier of a transmission by a signal source, the computer program comprising executable instructions for:

receiving the signal from the signal source;

in a first turbo loop:

a) estimating an interference plus noise covariance matrix according to a residual signal either received during a period when the signal source is not transmitting, or obtained by removing known values of the signal from a received training vector;

b) determining an equalizer function;

c) obtaining estimates of the unknown values by applying the equalizer function to the received signal;

d) deriving a residual signal by subtracting the value estimates from the received signal; and e) determining a residual amplitude matrix representing value amplitudes that remain after the subtraction of step d);

and:

repeating steps b), c), and d) in at least one turbo loop following the first turbo loop until estimates of the plurality of unknown values are obtained, each loop being applied to the residual signal vector and residual amplitude matrix obtained in the preceding loop.

According to this second aspect, determining the equalizer function in step b) of the first turbo loop includes performing a QR decomposition, and determining the equalizer function in step b) of turbo loops after the first turbo loop includes performing calculations that incorporate at least a partial result of the QR decomposition.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

An improved receiver design implements a method for modeling users in SIC turbo loop multiuser detection architectures having a reduced computational overhead. For near optimality, it is necessary for a turbo SIC receiver to update the linear equalizer on each turbo loop. This can add significant computational overhead, because it requires a matrix inversion. By reusing some of the computations from the previous turbo loop's equalizer calculation, the disclosed receiver significantly reduces this computational burden.

According to the disclosed method, during the first application of the linear equalizer (e.g. MMSE-IRC), before the forward error correction decoder, a matrix QR decomposition is computed to evaluate the equalizer output. From samples of the received signal acquired at a plurality of times, frequencies, and/or locations, the equalizer computes a single estimate of the transmitted information or "symbol." Note that the term "symbol" is used generically herein to refer to received information, and is not limited only to information derived from a symbol constellation, as would be the case for SC-FDMA. For simplicity of explanation, OFDM (Orthogonal Frequency Division Multiplexing) is used herein as an illustrative example. However, one of skill in the art will appreciate that the scope of the disclosed method is not limited to OFDM.

Figure 1:
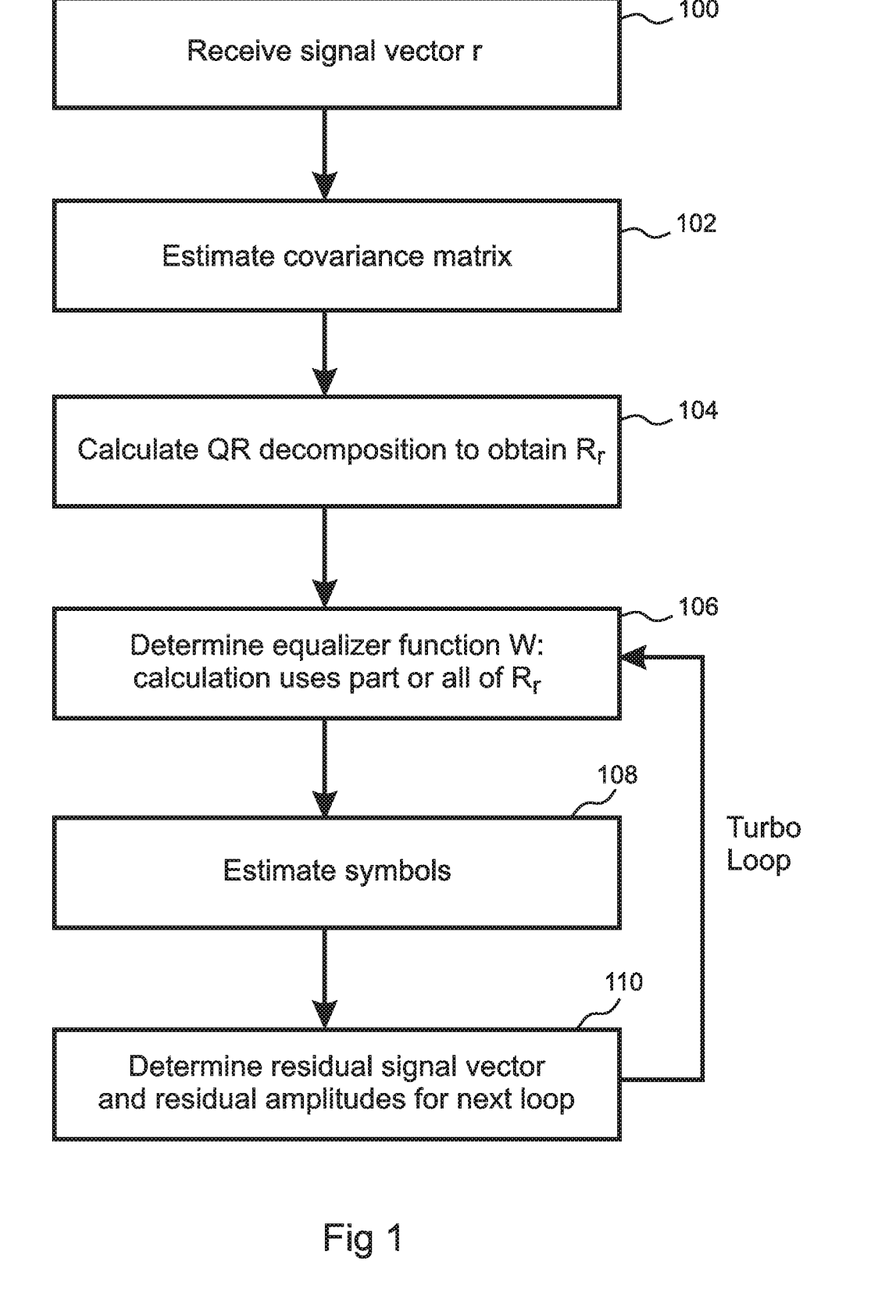
FIG. 1 is a flow diagram illustrating an embodiment of the method disclosed herein.

With reference to FIGS. 1-4, given a vector of transmitted symbols, s, received from one or more signal sources, the signal vector r received 100 over a single subcarrier in a multiple antenna receiver 402 is given by:

$$r = Hs + i + n, \quad (1)$$

where H is the mixture matrix (spatial mixture in this case), i is the interference from other environmental sources, and n is thermal noise in the receiver. The interference plus noise (i+n) is assumed to have a covariance matrix C given by:

$$E[(i+n)(i+n)^H] = C \quad (2)$$

The equalizer, W, provides an estimate ŝ of the transmitted symbol, s, according 108 to:

$$\hat{s} = W^H r \quad (3)$$

The choice of W can be based on many criteria but is typically computed by inverting a matrix comprising a plurality of the transmission parameters. As an example, the MMSE-IRC linear equalizer can be given by:

$$W = (HH^H + C + \lambda^2 I)^{-1} H \quad (4)$$

This formula for determining the equalizer is adopted herein because it is optimal, in some sense, and because many suboptimal options are approximations of this solution. In equation 4, I is an identity matrix, and λ is a constant that is used to "regularize" the inverse in case it is singular, or there is a large variance in the estimate of C.

Due to the computational complexity, as described above, in embodiments of the present method the matrix inverse indicated in equation 4 is not directly calculated. Instead, in embodiments, the disclosed receiver solves the system of equations:

$$(HH^H + C + \lambda^2 I)W = H \quad (5)$$

The matrix $(HH^H + C + \lambda^2 I)$ is referred to as the "covariance matrix." Because the covariance is positive definite, it can be decomposed into square root matrices:

$$(HH^H + C + \lambda^2 I) = R^H R \quad (6)$$

In practice the receiver does not know C ahead of time and must estimate it 102. This is typically done by estimating the interference when the signal of interest, s, is not present, or during a training period when the influence of the desired signal s can be removed (e.g. during a DRMS in LTE). The signal when s is not present (or has been removed) is referred to herein as the background signal, $\tilde{r}$. Accordingly, in embodiments, C is estimated by averaging the outer product of N observations of $\tilde{r}$, where the estimate $\hat{C}$ is given by $$\hat{C} = \frac{1}{N}\sum \tilde{r}\tilde{r}^H \quad (7)$$

Based on the above, an important enabling concept for the disclosed method is the fact that:

$$(HH^H + C + \lambda^2 I) = \begin{bmatrix} H & \frac{1}{\sqrt{N}}\tilde{r} & \lambda I \end{bmatrix} \begin{bmatrix} H^H \\ \frac{1}{\sqrt{N}}\tilde{r}^H \\ \lambda I \end{bmatrix} \quad (9)$$

Accordingly, the standard QR decomposition can be taken on the matrix:

$$\begin{bmatrix} H^H \\ \frac{1}{\sqrt{N}}\tilde{r}^H \\ \lambda I \end{bmatrix} = QR \quad (10)$$

where Q is unitary and R is upper triangular. Because Q is a unitary matrix, the R matrix in equation 10 is a matrix square root of the covariance matrix as desired, i.e.:

$$(HH^H + C + \lambda^2 I) = R^H R \quad (11)$$

Based on this relationship, the equalizer equation 5 can be re-written as:

$$R^H R W = H \quad (12)$$

and solved 106 for W using forward and backward substitution on the upper triangular matrix R.

After the first turbo loop, a significant amount of energy from each symbol is subtracted from the received signal vector r, to obtain 110 a residual signal $r_2$, where the subscript "2" indicates that this is the signal vector to which the second turbo loop will be applied. Note that r can similarly be designated as $r_1$ because it is the signal vector to which the first turbo loop is applied. This has the effect of changing the optimal equalizer by adjusting scale (energy) of the columns of the symbol mixing matrix H. The new signal vector $r_2$ to which the second turbo loop is applied is then given by:

$$r_2 = HA_2 s + i + n \quad (13)$$

where $A_2$ is a diagonal matrix representing the amplitude remaining for each symbol after SIC on turbo loop 2, and in general $A_i$ represents the amplitude remaining for each symbol after SIC on turbo loop i. Of course, $A_1$ does not explicitly appear in equation 1 because $A_1$ is the identity matrix. Note that equation 13 can be written as:

$$r_2 = r - H\hat{s}_1 \quad (14)$$

where $\hat{s}_1$ is the vector of estimates that were subtracted from $r_1$ in turbo loop one. This has the effect of changing the MMSE-IRC equalizer equation to:

$$W = (HA_2^2 H^H + C + \lambda^2 I)^{-1} \quad (15)$$

Also note that $Wr_2$ is the revised estimate for each symbol, and that the final equalized output on turbo loop 2 is given by:

$$\hat{s}_1 = \hat{s}_1 + \text{diag}(H^H W)^{-1} W^H r_2 \quad (16)$$

where $\text{diag}(H^H W)$ is the diagonal matrix taken from $H^H W$, which is a scaling factor necessary to make the estimate unbiased.

In general, to solve the equalization problem on turbo loop n, it is necessary to find the QR decomposition of $(H A_n^2 H^H + C + \lambda^2 I)$, and to solve the resulting system of equations. An important enabling concept of the disclosed method is the approach of using a partial result of the QR decomposition from the first turbo loop to significantly reduce the computational overhead in subsequent turbo loops. In particular, the matrix $C + \lambda^2 I$ does not change between turbo loops, which means that its QR decomposition can be computed once, during the first turbo loop, and then reused during subsequent turbo loops so as to reduce the computational overhead in calculating the total QR decomposition.

For example, let:

$$\begin{bmatrix} \frac{1}{\sqrt{N}}\tilde{r}^H \\ \lambda I \end{bmatrix} = Q_r R_r \quad (17)$$

where $Q_r$ is a unitary matrix and $R_r$ is upper triangular. Then it can be seen that:

$$\begin{bmatrix} A_n H^H \\ \frac{1}{\sqrt{N}}\tilde{r}^H \\ \lambda I \end{bmatrix} = \begin{bmatrix} 1 & 0 \\ 0 & Q_r \end{bmatrix}\begin{bmatrix} A_n H^H \\ R_r \end{bmatrix} \quad (18)$$

Note that because $R_r$ is already upper triangular, it is significantly easier to do a QR decomposition on $$\begin{bmatrix} A_n H^H \\ R_r \end{bmatrix}$$

than on $$\begin{bmatrix} A_n H^H \\ \frac{1}{\sqrt{N}} \bar{r}^H \\ \lambda I \end{bmatrix},$$

and that the final upper triangular matrix R will still be correct. Therefore, in embodiments the disclosed receiver is configured to calculate $R_r$ on the first turbo loop 104, and then to store it for reuse in all successive turbo loops.

In other embodiments, the following alternative, but equivalent, equation is used to determine the equalizer in turbo loop n:

$$W^H A_n^{-2} [A_n^{-2} + H^H C^{-1} H]^{-1} H^H C^{-1} \qquad (19)$$

In these embodiments, the equalizer W is implemented differently. On the first turbo loop, the receiver solves a system of two linear equations, and then the solution is reused on all subsequent turbo loops.

In various embodiments, the receiver begins by calculating the QR decomposition of equation 17:

$$\begin{bmatrix} \frac{1}{\sqrt{N}} \bar{r}^H \\ \lambda I \end{bmatrix} = Q_r R_r.$$

Figure 3:
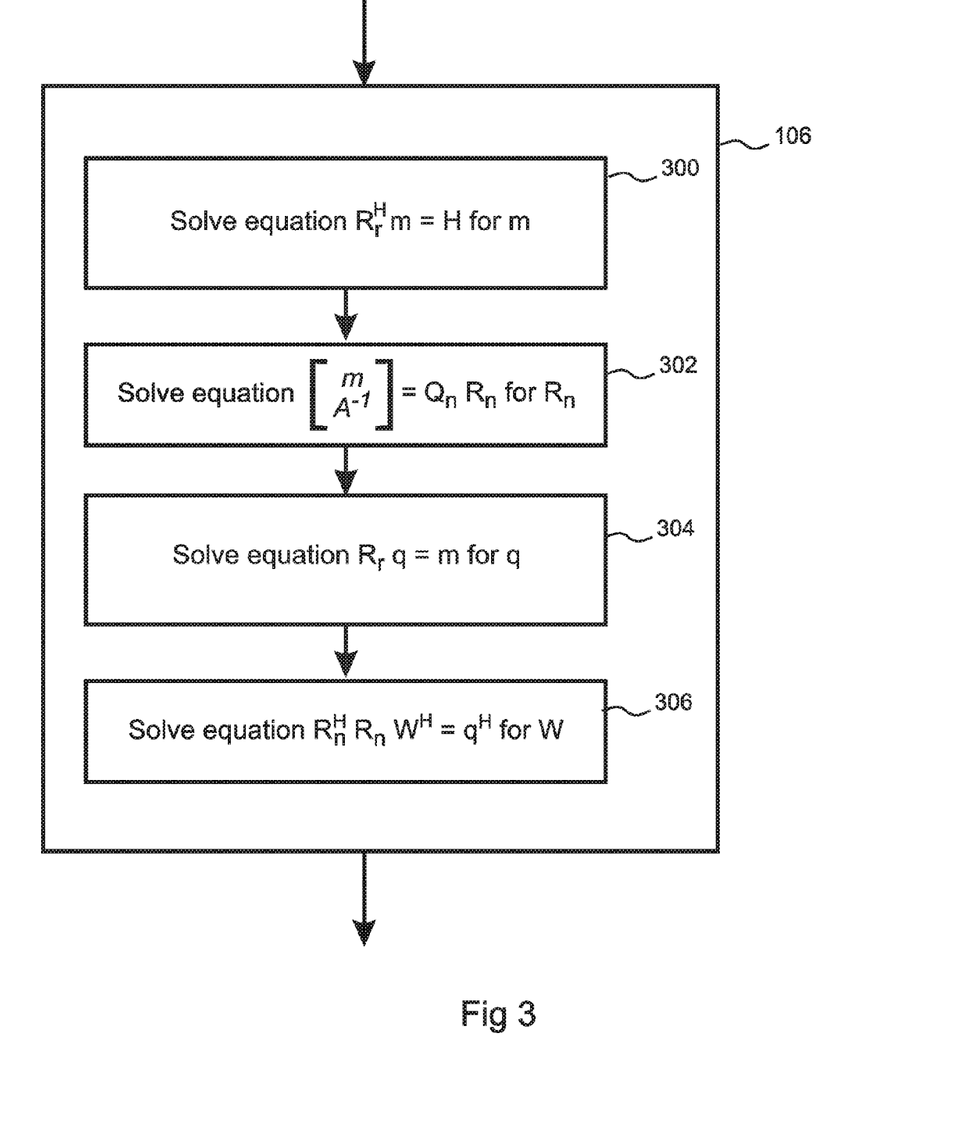
FIG. 3 is a flow diagram illustrating an alternate method for calculating W in an embodiment of the method disclosed herein.

In this case $R_r$ is a matrix square root of C, with some regularization for numerical and estimation stability. The receiver then solves the system of equations 300:

$$R_r^H m = H \qquad (20)$$

and derives:

$$m = c^{-1/2} H \qquad (21)$$

Next, the receiver solves 304 the equation:

$$R_r q = m \qquad (22)$$

for q to obtain:

$$q = C^{-1} H \qquad (23)$$

These quantities, determined in the first turbo loop, can then be stored and used in every subsequent turbo loop, which can be clearly seen from equation 19.

Finally, the receiver solves the equation $$(A_n^{-2} + H^H C^{-1} H) W^H = H^H C^{-1} \qquad (24)$$

for $W^H$. In embodiments, the receiver solves equation 24 by finding 302 the QR decomposition of:

$$\begin{bmatrix} m \\ A_n^{-1} \end{bmatrix} = Q_n R_n \qquad (25)$$

and then solving 306 the equation:

$$R_n^H R_n W^H = q^H = H^H C^{-1} \qquad (26)$$

Accordingly, instead of computing a full QR decomposition on $$\begin{bmatrix} C^{-1/2} H^H A_n \\ I \end{bmatrix}$$

in each turbo loop, as some previous approaches may have done, the computational overhead is significantly decreased in these embodiments by reformulating and solving the system in a different way that exploits results obtained in previous turbo loop computations, as well as the fact that the matrix A is diagonal.

Figure 2:
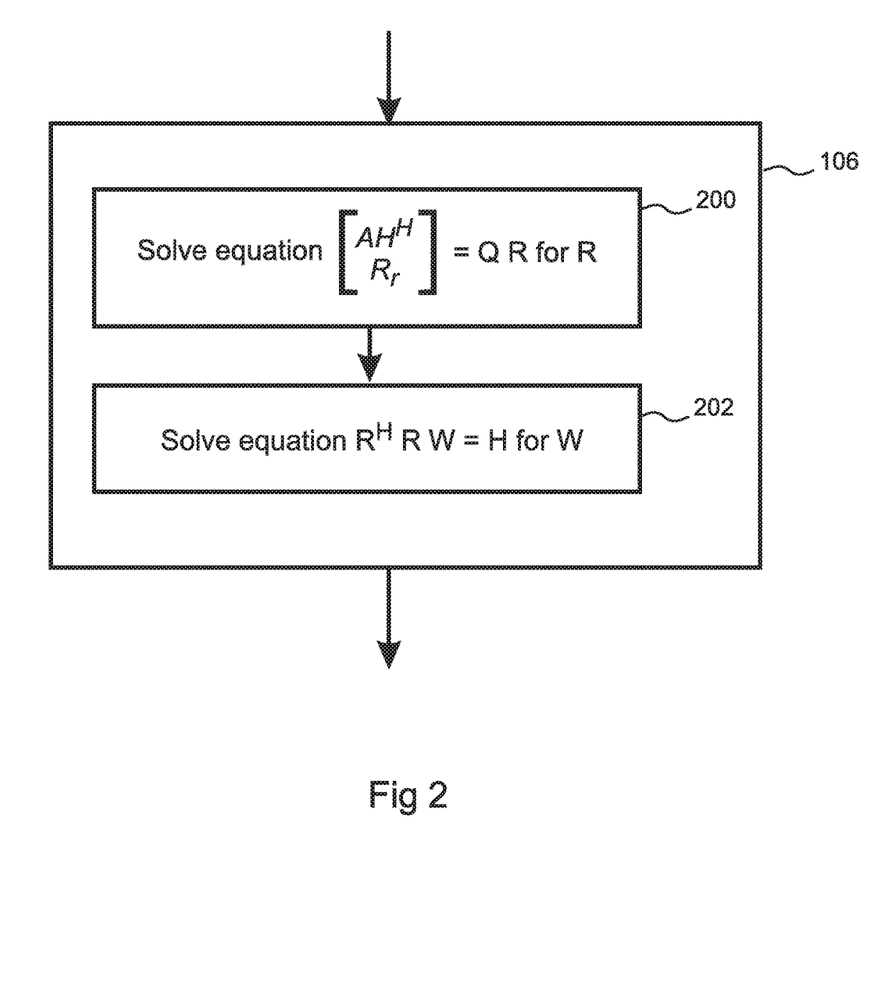
FIG. 2 is a flow diagram illustrating a method for calculating W in an embodiment of the method disclosed herein.
Figure 4:
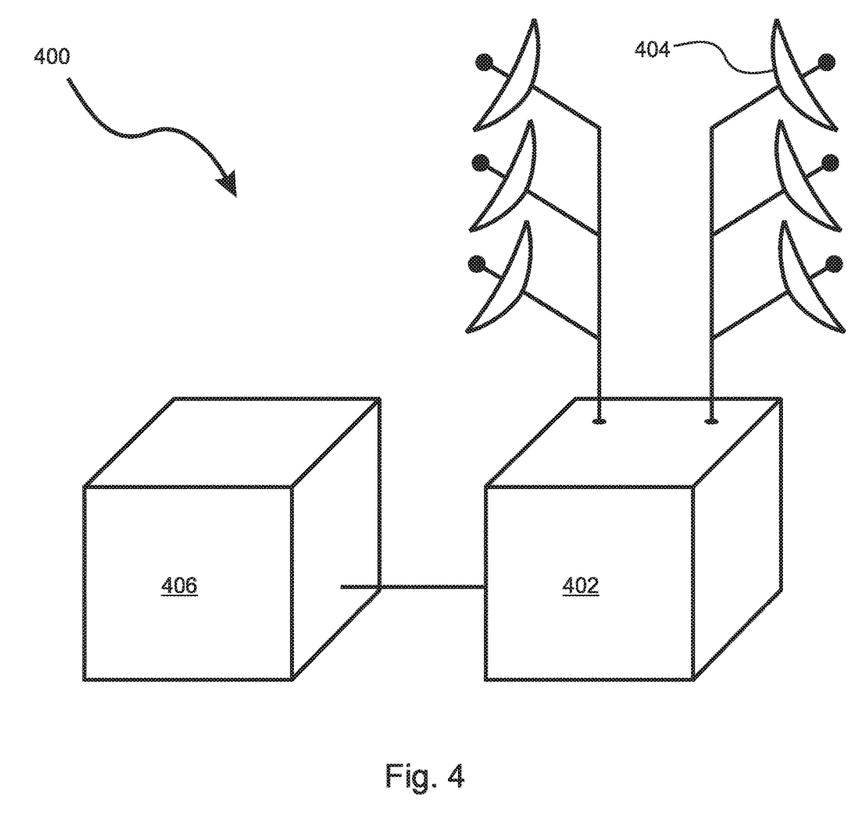
FIG. 4 is a block diagram illustrating an embodiment of the disclosed system.

With reference to FIG. 4, the system disclosed herein 400 includes a signal receiving unit 402 in communication with at least one antenna 404 and configured to receive a transmission including data streams from a plurality of signal sources, and a signal processing unit 406 that performs computations indicated in FIGS. 1-3.

The controller 406 is an instruction execution machine, apparatus, or device and may comprise one or more of a microprocessor, a digital signal processor, a graphics processing unit, an application specific integrated circuit (ASIC), a field programmable gate array (FPGA), and the like. The controller 406 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The controller 306 and receiver 402 preferably detect and analyze transmissions from a base station ("BS") that operates in a networked environment using logical connections to one or more remote nodes (not shown). The remote node may be another BS, a UE, a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, a communication interface may include logic configured to support direct memory access (DMA) transfers between memory and other devices.

It should be understood that the arrangement illustrated in FIG. 4 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 400. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method for efficiently estimating a plurality of unknown values included in a signal transmitted over a subcarrier of a transmission by a signal source, the method comprising:
   receiving the signal from the signal source;
   in a first turbo loop:
   a) estimating an interference plus noise covariance matrix according to a residual signal either received during a period when the signal source is not transmitting, or obtained by removing known values of the signal from a received training vector;
   b) determining an equalizer function;
   c) obtaining estimates of the unknown values by applying the equalizer function to the received signal;
   d) deriving a residual signal vector by subtracting the value estimates from the received signal; and
   e) determining a residual amplitude matrix representing value amplitudes that remain after the subtraction of step d); and:
   repeating steps b), c), and d) in at least one turbo loop following the first turbo loop until estimates of the plurality of unknown values are obtained, each loop being applied to the residual signal vector and residual amplitude matrix obtained in the preceding loop, wherein:
   determining the equalizer function in step b) of the first turbo loop includes performing a QR decomposition; and
   determining the equalizer function in step b) of turbo loops after the first turbo loop includes performing calculations that incorporate at least a partial result of the QR decomposition.

2. The method of claim 1, wherein:
   receiving the signal includes obtaining a received signal vector r that includes N observations of the signal, r being given by r=H s+i+n, where s is a vector representing the plurality of unknown values transmitted by the signal source, H is a mixture matrix, i represents interference included in the received signal, and n represents thermal receiver noise included in the received signal;
   the QR decomposition included in step b) of the first turbo loop includes obtaining an upper triangular matrix Rr by solving the equation $$\begin{bmatrix} \frac{1}{\sqrt{N}} \tilde{r}^H \\ \lambda I \end{bmatrix} = Qr \ Rr,$$

where $\lambda$ is a constant, I is the unity matrix, and Qr is a unitary matrix; and
   incorporating at least a partial result of the QR decomposition in step b) of turbo loops after the first turbo loop includes performing calculations that incorporate at least part of the matrix Rr.

3. The method of claim 2, wherein the equalizer function W is the solution of the equation RH R W=H, where:
   R is an upper triangular matrix solution to the equation $$\begin{bmatrix} AH^H \\ R_r \end{bmatrix} = QR;$$

Q is a unitary matrix; and
   A is a diagonal matrix representing value amplitudes that remain after the subtraction of step d).

4. The method of claim 2, wherein the equalizer function W is the solution of the equation $R_n^H R_n$ WH=qH, where:
   q is the solution to the equation Rr q=m;
   m is the solution to the equation $R_r^H$ m=H;
   Rn is an upper triangular matrix solution to the equation $$\begin{bmatrix} m \\ A^{-1} \end{bmatrix} = Qn \ Rn;$$

Qn is a unitary matrix; and
   performing calculations that incorporate at least part of the matrix Rr in turbo loop as after the first turbo loop includes sharing at least one of Rr, m, and q between successive turbo loops.

5. The method of claim 2, wherein obtaining the estimates in step c) includes obtaining a vector ŝ of value estimates by applying the equalizer function W to r according to the equation ŝ=WHr.

6. The method of claim 5, wherein deriving the residual signal in step d) includes deriving a residual signal vector rr by subtracting the value estimates ŝ from the received signal vector r according to the equation rr=r−H ŝ.

7. The method of claim 5, wherein the residual amplitude matrix A is determined in step e) according to the equation s−ŝ=A s, where A is a diagonal matrix representing value amplitudes that remaining after the subtraction of step d).

8. The method of claim 1, wherein at least one of the turbo loops following the first turbo loop further includes repeating step e).

9. The method of claim 1, wherein at least one of the turbo loops includes improving the estimates of the values by decoding at least one error correction.

10. The method of claim 1, wherein the unknown values transmitted by the signal source are transmitted symbols.

11. The method of claim 10, further comprising presenting the estimated symbols to a user.

12. The method of claim 1, wherein the transmission is a transmission between nodes in a wireless communication network.

13. The method of claim 1, wherein the transmission is a transmission between a fixed base station and a mobile handset in a wireless cellular telecommunications network.

14. The method of claim 13, wherein the transmission is encoded according to a protocol that conforms to one of Orthogonal Frequency Division Multiplexing (OFDM) and Single-Carrier Frequency Division Multiple Access (SC-FDMA).

15. The method of claim 13, wherein the transmission adheres to the Long Term Evolution (LTE) protocol.

16. A system for efficiently estimating a plurality of unknown values included in a signal transmitted over a subcarrier of a transmission by a signal source, the system comprising:
a receiver unit configured to receive the signal from the signal source; and
a signal processing unit configured to:
in a first turbo loop:
a) estimate an interference plus noise covariance matrix according to a residual signal either received during a period when the signal source is not transmitting, or obtained by removing known values of the signal from a received training vector;
b) determine an equalizer function;
c) obtain estimates of the unknown values by applying the equalizer function to the received signal;
d) derive a residual signal vector by subtracting the value estimates from the received signal; and
e) determine a residual amplitude matrix representing value amplitudes that remain after the subtraction of step d);
and:
repeat steps b), c), and d) in at least one turbo loop following the first turbo loop until estimates of the plurality of unknown values are obtained, each loop being applied to the residual signal vector and residual amplitude matrix obtained in the preceding loop,
wherein:
determining the equalizer function in step b) of the first turbo loop includes performing a QR decomposition; and
determining the equalizer function in step b) of turbo loops after the first turbo loop includes performing calculations that incorporate at least a partial result of the QR decomposition.

17. The system of claim 16, wherein:
receiving the signal includes obtaining a received signal vector r that includes N observations of the signal, r being given by r=H s+i+n, where s is a vector representing the plurality of unknown values transmitted by the signal source, H is a mixture matrix, i represents interference included in the received signal, and n represents thermal receiver noise included in the received signal;
the QR decomposition included in step b) of the first turbo loop includes obtaining an upper triangular matrix Rr by solving the equation $$\begin{bmatrix} \frac{1}{\sqrt{N}} \tilde{r}^H \\ \lambda I \end{bmatrix} = Qr\ Rr,$$

where $\lambda$ is a constant, I is the unity matrix, and Qr is a unitary matrix; and incorporating at least a partial result of the QR decomposition in step b) of turbo loops after the first turbo loop includes performing calculations that incorporate at least part of the matrix Rr.

18. The system of claim 17, wherein the equalizer function W is the solution of the equation RH R W=H, where:
R is an upper triangular matrix solution to the equation $$\begin{bmatrix} AH^H \\ R_r \end{bmatrix} = QR;$$

Q is a unitary matrix; and
A is a diagonal matrix representing value amplitudes that remain after the subtraction of step d).

19. The system of claim 17, wherein the equalizer function W is the solution of the equation $R_n^H R_n$ WH=qH, where:
q is the solution to the equation Rr q=m;
m is the solution to the equation $R_r^H$ m=H;
Rn is an upper triangular matrix solution to the equation $$\begin{bmatrix} m \\ A^{-1} \end{bmatrix} = Qn\ Rn;$$

Qn is a unitary matrix; and
performing calculations that incorporate at least part of the matrix Rr in turbo loop as after the first turbo loop includes sharing at least one of Rr, m, and q between successive turbo loops.

20. The system of claim 17, wherein obtaining the estimates in step c) includes obtaining a vector ŝ of value estimates by applying the equalizer function W to r according to the equation ŝ=WHr.

21. The system of claim 20, wherein deriving the residual signal in step d) includes deriving a residual signal vector rr by subtracting the value estimates ŝ from the received signal vector r according to the equation rr=r−Hŝ.

22. The system of claim 20, wherein the residual amplitude matrix A is determined in step e) according to the equation s−ŝ=A s, where A is a diagonal matrix representing value amplitudes that remaining after the subtraction of step d).

23. The system of claim 16, wherein at least one of the turbo loops following the first turbo loop further includes repeating step e).

24. The method of claim 16, wherein at least one of the turbo loops includes improving the estimates of the values by decoding at least one error correction.

25. The system of claim 16, wherein the unknown values transmitted by the signal source are transmitted symbols.

26. The system of claim 25, further comprising presenting the estimated symbols to a user.

27. The system of claim 16, wherein the transmission is a transmission between nodes in a wireless communication network.

28. The system of claim 16, wherein the transmission is a transmission between a fixed base station and a mobile handset in a wireless cellular telecommunications network.

29. The system of claim 16, wherein the transmission is encoded according to a protocol that conforms to one of Orthogonal Frequency Division Multiplexing (OFDM) and Single-Carrier Frequency Division Multiple Access (SC-FDMA).

30. The system of claim 16, wherein the transmission adheres to the Long Term Evolution (LTE) protocol.

31. A non-transitory computer readable medium storing a computer program, executable by a machine, for efficiently estimating a plurality of unknown values included in a signal transmitted over a subcarrier of a transmission by a signal source, the computer program comprising executable instructions for:

receiving the signal from the signal source;

in a first turbo loop:

a) estimating an interference plus noise covariance matrix according to a residual signal either received during a period when the signal source is not transmitting, or obtained by removing known values of the signal from a received training vector;

b) determining an equalizer function;

c) obtaining estimates of the unknown values by applying the equalizer function to the received signal;

d) deriving a residual signal vector by subtracting the value estimates from the received signal; and e) determining a residual amplitude matrix representing value amplitudes that remain after the subtraction of step d); and:

repeating steps b), c), and d) in at least one turbo loop following the first turbo loop until estimates of the plurality of unknown values are obtained, each loop being applied to the residual signal vector and residual amplitude matrix obtained in the preceding loop, wherein:

determining the equalizer function in step b) of the first turbo loop includes performing a QR decomposition; and determining the equalizer function in step b) of turbo loops after the first turbo loop includes performing calculations that incorporate at least a partial result of the QR decomposition.

* * * * *